United States Patent
Li

(10) Patent No.: US 10,924,710 B1
(45) Date of Patent: Feb. 16, 2021

(54) METHOD FOR MANAGING AVATARS IN VIRTUAL MEETING, HEAD-MOUNTED DISPLAY, AND NON-TRANSITORY COMPUTER READABLE STORAGE MEDIUM

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/827,722

(22) Filed: Mar. 24, 2020

(51) Int. Cl.
| | | |
|---|---|---|
| H04N 7/15 | (2006.01) | |
| G06T 13/40 | (2011.01) | |
| G06F 3/16 | (2006.01) | |
| H04N 13/20 | (2018.01) | |
| H04N 13/344 | (2018.01) | |

(52) U.S. Cl.
CPC ............. *H04N 7/157* (2013.01); *G06F 3/167* (2013.01); *G06T 13/40* (2013.01); *H04N 13/20* (2018.05); *H04N 13/344* (2018.05)

(58) Field of Classification Search
CPC ....... G06T 13/40; G06T 19/00; G02B 27/017; G02B 27/01; G02B 2027/0178; H04N 7/157

USPC ........................................... 348/14.01–14.16
See application file for complete search history.

(56) References Cited

U.S. PATENT DOCUMENTS

| | | | |
|---|---|---|---|
| 2004/0130614 A1* | 7/2004 | Valliath | H04N 7/147 348/14.01 |
| 2008/0151786 A1* | 6/2008 | Li | H04N 7/142 370/276 |
| 2015/0215581 A1* | 7/2015 | Barzuza | G06F 3/04842 348/14.1 |
| 2016/0080819 A1* | 3/2016 | Moran | G06F 3/04842 725/14 |
| 2018/0322681 A1* | 11/2018 | Inomata | A63F 13/211 |

\* cited by examiner

*Primary Examiner* — Melur Ramakrishnaiah
(74) *Attorney, Agent, or Firm* — JCIPRNET

(57) ABSTRACT

The disclosure provides a method for managing a virtual meeting, a head-mounted display, and a non-transitory computer readable storage medium. The method includes: detecting whether an external participant exists in an image capturing range of a front camera of the head-mounted display while the head-mounted display is participating the virtual meeting; in response to determining that the external participant existing in the image capturing range of the front camera of the head-mounted display, adding a specific avatar representing the external participant into the virtual meeting; identifying an appearance characteristic of the external participant; mapping the appearance characteristic of the external participant to an appearance of the specific avatar.

16 Claims, 2 Drawing Sheets

METHOD FOR MANAGING AVATARS IN VIRTUAL MEETING, HEAD-MOUNTED DISPLAY, AND NON-TRANSITORY COMPUTER READABLE STORAGE MEDIUM

BACKGROUND OF THE INVENTION

1. Field of the Invention

The present invention generally relates to a mechanism for managing a virtual meeting, in particular, to a method for managing avatars in a virtual meeting, a head-mounted display, and a non-transitory computer readable storage medium.

2. Description of Related Art

With the development of virtual reality (VR) technology, various VR applications and services have been provided in the market, and one of the applications is to use the VR environment to hold a virtual meeting. However, in some cases, if someone without a head-mounted display wants to join an existing virtual meeting, there is no conventional way that may be used to provide a proper solution.

SUMMARY OF THE INVENTION

Accordingly, the present invention is directed to a method for managing avatars in a virtual meeting, a head-mounted display, and a non-transitory computer readable storage medium, which may be used to solve the above technical problem.

The disclosure provides a method for managing a virtual meeting, adapted for a head-mounted display. The method includes: detecting whether an external participant exists in an image capturing range of a front camera of the head-mounted display while the head-mounted display is participating the virtual meeting; in response to determining that the external participant existing in the image capturing range of the front camera of the head-mounted display, adding a specific avatar representing the external participant into the virtual meeting; identifying an appearance characteristic of the external participant; mapping the appearance characteristic of the external participant to an appearance of the specific avatar.

The disclosure provides a head-mounted display including a front camera and a processor. The processor is coupled to the front camera, and configured to: detect whether an external participant exists in an image capturing range of the front camera of the head-mounted display while the head-mounted display is participating a virtual meeting; in response to determining that the external participant existing in the image capturing range of the front camera of the head-mounted display, add a specific avatar representing the external participant into the virtual meeting; identify an appearance characteristic of the external participant; map the appearance characteristic of the external participant to an appearance of the specific avatar.

The disclosure provides a non-transitory computer readable storage medium, recording an executable computer program to be loaded by a head-mounted display to execute steps of: detecting whether an external participant exists in an image capturing range of a front camera of the head-mounted display while the head-mounted display is participating the virtual meeting; in response to determining that the external participant existing in the image capturing range of the front camera of the head-mounted display, adding a specific avatar representing the external participant into the virtual meeting; identifying an appearance characteristic of the external participant; mapping the appearance characteristic of the external participant to an appearance of the specific avatar.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
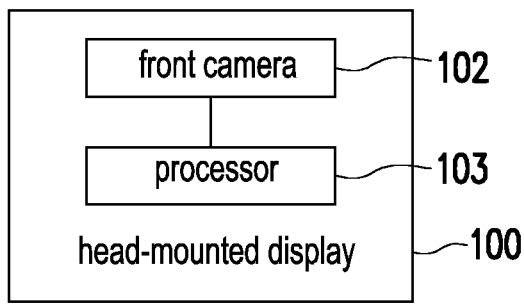
FIG. 1 is a functional block diagram of a head-mounted display according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which is a functional block diagram of a head-mounted display according to an embodiment of the disclosure. In FIG. 1, a head-mounted display 100 may be used to provide VR services, augmented reality (AR) services, or the like. In some embodiments, the head-mounted display 100 may be coupled with a computer device to receive VR contents from the computer device, but the disclosure is not limited thereto.

As shown in FIG. 1, the head-mounted display 100 may include a front camera 102 and a processor 104. The front camera 102 may be disposed at a front side or any desired position of the head-mounted display 100 for capturing images of the environment near a wearer of the head-mounted display 100.

The processor 104 may be coupled with the front camera 102, and may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

In the following discussions, the VR service provided by the head-mounted display 100 may be assumed as a VR content related to a virtual meeting. More specifically, the head-mounted display 100 may, for example, display a screen of a VR chatting room of the virtual meeting. In some embodiments, the screen of the VR chatting room may include virtual objects such as tables, couches, and avatars that represent the participants of the virtual meeting. The participants may be other people wearing their own head-mounted display and have joined the virtual meeting. For other participants without a head-mounted display but wants to join the virtual meeting, the head-mounted display 100 may be used to help them.

For facilitating the following discussions, the participant without a head-mounted display but wants to join the virtual meeting may be referred to as an external participant, and the external participant may be assumed to be near the head-mounted display 100 (e.g., being in the same room in reality), such that the head-mounted display 100 may be used to help the external participant to join the virtual meeting.

Roughly speaking, the disclosure provides a method for managing avatars in the virtual meeting, in which the head-mounted display 100 may add a specific avatar representing the external participant into the virtual meeting, and adjusting the appearance of the specific avatar based on appearance characteristics of the external participant, such that other participants of the virtual meeting may observe how the posture, gesture, facial expressions of the external participant change from the specific avatar.

In various embodiments, the processor 104 may be loaded with specific software modules, codes, programs to implement the method for managing avatars in the virtual meeting.

Figure 2:
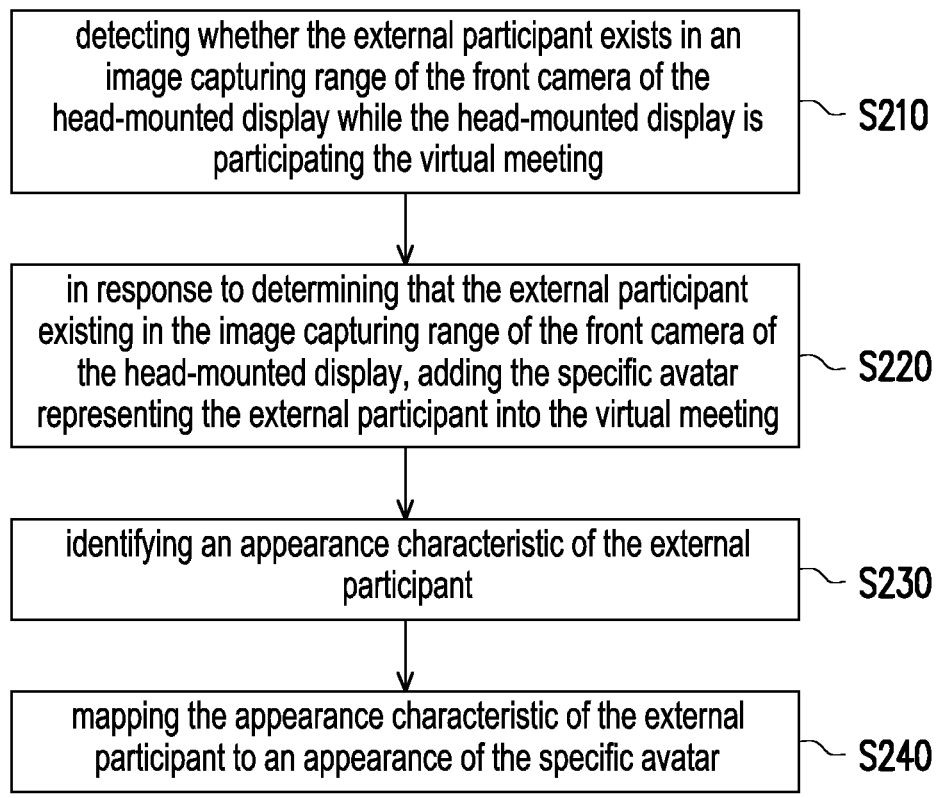
FIG. 2 shows a flow chart of the method for managing avatars in the virtual meeting according to an embodiment of the disclosure.

See FIG. 2, which shows a flow chart of the method for managing avatars in the virtual meeting according to an embodiment of the disclosure. The method of FIG. 2 may be implemented by the head-mounted display 100 of FIG. 1, and details of the steps of FIG. 2 would be discussed in references with the elements shown in FIG. 1.

Firstly, in step S210, the processor 104 may detect whether the external participant exists in an image capturing range of the front camera 102 of the head-mounted display 100 while the head-mounted display 100 is participating the virtual meeting.

In a first embodiment, the processor 104 may control the front camera 102 to capture a plurality of images. In response to determining that a face existing in the images, the processor 104 may determine that the external participant exists in the image capturing range of the front camera 102 of the head-mounted display 100. Specifically, when people are holding meetings, it is less possible for irrelevant people to be in the same environment. Therefore, when the wearer of the head-mounted display 100 is in the virtual meeting, the people nearby is highly possible to be one of the participants of the virtual meeting. In this case, whenever there is a face existing in the images captured by the front camera, this face may be regarded as the face of the external participant, but the disclosure is not limited thereto.

In a second embodiment, the processor 104 may retrieve a voice characteristic (e.g., pitch, voiceprint, etc.) of the wearer of the head-mounted display 100 via, for example, a microphone of the head-mounted display 100. Next, the processor 104 may detect whether the microphone has received any human voice. If a human voice being detected does not match the voice characteristic of the wearer of the head-mounted display 100, it may represent that the detected human voice comes from the external participant based on the same reason mentioned in the first embodiment. Therefore, in response to determining that a human voice being detected does not match the voice characteristic of the wearer of the head-mounted display 100, the processor 104 may control the front camera 102 to capture a face in the image capturing range. In response to determining that the face has been detected in the image capturing range, the processor 104 may determine that the external participant existing in the image capturing range of the front camera 102 of the head-mounted display 100. In this way, the front camera 102 does not need to be constantly activated.

Afterwards, in step S220, in response to determining that the external participant existing in the image capturing range of the front camera 102 of the head-mounted display 100, the processor 104 may add a specific avatar representing the external participant into the virtual meeting.

In some embodiments, if the external participant used the VR service of the virtual meeting before, the external participant may have a previously used avatar that represented the external participant in previous virtual meetings. Therefore, the processor 104 may determine whether the external participant has the previously used avatar. In response to determining that the external participant has the previously used avatar, the processor 104 may add the previously used avatar into the virtual meeting as the specific avatar for representing the external participant. However, if the external participant has no previously used avatar, it may mean that the external participant has never used the VR service of the virtual meeting before, and hence the processor 104 may create a new avatar for representing the external participant and add the new avatar into the virtual meeting as the specific avatar for representing the external participant, but the disclosure is not limited thereto.

In some embodiments, after determining that the external participant existing in the image capturing range of the front camera 102 of the head-mounted display 100, the processor 104 may provide a notification for the wearer of the head-mounted display to determine whether to add the specific avatar of the external participant into the virtual meeting. For example, the notification may be displayed by the head-mounted display 100 for the wearer to confirm. In response to determining that the wearer of the head-mounted display has confirmed to add the specific avatar of the external participant into the virtual meeting, the processor 104 may correspondingly add the specific avatar representing the external participant into the virtual meeting.

In step S230, the processor 104 may identify an appearance characteristic of the external participant. In some embodiments the appearance characteristic of the external participant may include at least one of a posture, a gesture, and a facial expression of the external participant, but the disclosure is not limited thereto.

In various embodiments, the processor 104 may identify the appearance characteristic of the external participant by performing related image recognitions (e.g., a posture recognition, a gesture recognition, and/or a facial expression recognition, etc.) based on the images captured by the front camera 102, but the disclosure is not limited thereto.

In step S240, the processor 104 may map the appearance characteristic of the external participant to an appearance of the specific avatar. In one embodiment, the processor 104 may modify at least one of a posture, a gesture, and a facial expression of the specific avatar based on the appearance characteristic of the external participant, such that the specific avatar may characterize the changes of the appearance characteristic of the external participant.

For example, if the identified appearance characteristic of the external participant shows that the external participant has raised the left hand, the processor 104 may modify the specific avatar to perform a posture of raising its left hand. For another example, if the identified appearance characteristic of the external participant shows that the external participant has smiled, the processor 104 may modify the specific avatar to perform a facial expression of smiling. For yet another example, if the identified appearance characteristic of the external participant shows that the external participant has tilted the head, the processor 104 may modify the specific avatar to perform a posture of tilting its head.

Accordingly, other participants of the virtual meeting may observe the changes of the appearance characteristics of the external participant from the specific avatar, even though the external participant does not participate the virtual meeting by using any head-mounted display and/or the external participant is not near some of the participants of the virtual meeting.

In some embodiments, the disclosure further provides a mechanism for allowing the external participant to communicate with other participants of the virtual meeting. Specifically, the processor 104 may detect a specific voice content provided by the external participant and control the specific avatar to output the specific voice content. Therefore, other participants of the virtual meeting may hear the specific voice content of the external participant from the specific avatar.

In a third embodiment, in response to a voice content has been detected, the processor 104 may identify whether a mouth of the external participant is moving. For example, as the voice content is being detected, the processor 104 may simultaneously perform a facial expression recognition on the images captured by the front camera 102 to determine whether the mouth of the external participant is moving. If yes, it represents that the voice content may be specific voice content provided by the external participant, otherwise the voice content may be irrelevant to the external participant. Therefore, in response to determining that the mouth of the external participant is moving when the voice content is being detected, the processor 104 may determine that the voice content is the specific voice content provided by the external participant and control the specific avatar to output the specific voice content.

In a fourth embodiment, the processor 104 may firstly obtain a specific location where the external participant locates relative to the head-mounted display 100. For example, the processor 104 may perform related image recognitions on the images captured by the front camera 102 to detect the specific location where the external participant locates, but the disclosure is not limited thereto. Next, in response to a voice content has been detected, the processor 104 may identify a specific direction where the voice content comes from by, for example, directional microphones or the like. If the specific direction points to the specific location, it may represent that the voice content comes from the external participant. Therefore, in response to determining that the specific direction corresponds to the specific location, the processor 104 may determine that the voice content is the specific voice content provided by the external participant and control the specific avatar to output the specific voice content.

Further, the disclosure has provided several mechanisms for allowing the external participant to hear audio contents associated with the virtual meeting (e.g., voices from other participants).

For example, the head-mounted display 100 may be disposed with a speaker for outputting voice outward. More specifically, in general, a traditional head-mounted display merely has a pair of small speakers locating near the ears of the wearer for playing audio for the wearer to hear. That is, those small speakers are not designed for outputting voice outward for other people to hear. However, with the speaker for outputting voice outward, the head-mounted display 100 may be capable of outputting audio contents for other people to hear. In this way, the processor 104 may control the speaker to output an audio content associated with the virtual meeting, such that the audio content may be heard by the external participant.

For another example, the head-mounted display 100 may be paired with an electronic device, such as wireless headphones (e.g., Bluetooth headphones), an external speaker, a smart device (e.g., the smart phone of the external participant), a wired headphone, etc. Afterwards, the processor 104 may provide an audio content associated with the virtual meeting to the electronic device for the electronic device to output the audio content. Therefore, the external participant may hear the audio content of the virtual meeting via the electronic device paired with the head-mounted display 100.

Accordingly, the external participant without a head-mounted display may be able to communicate with other participants in the virtual meeting.

Figure 3:
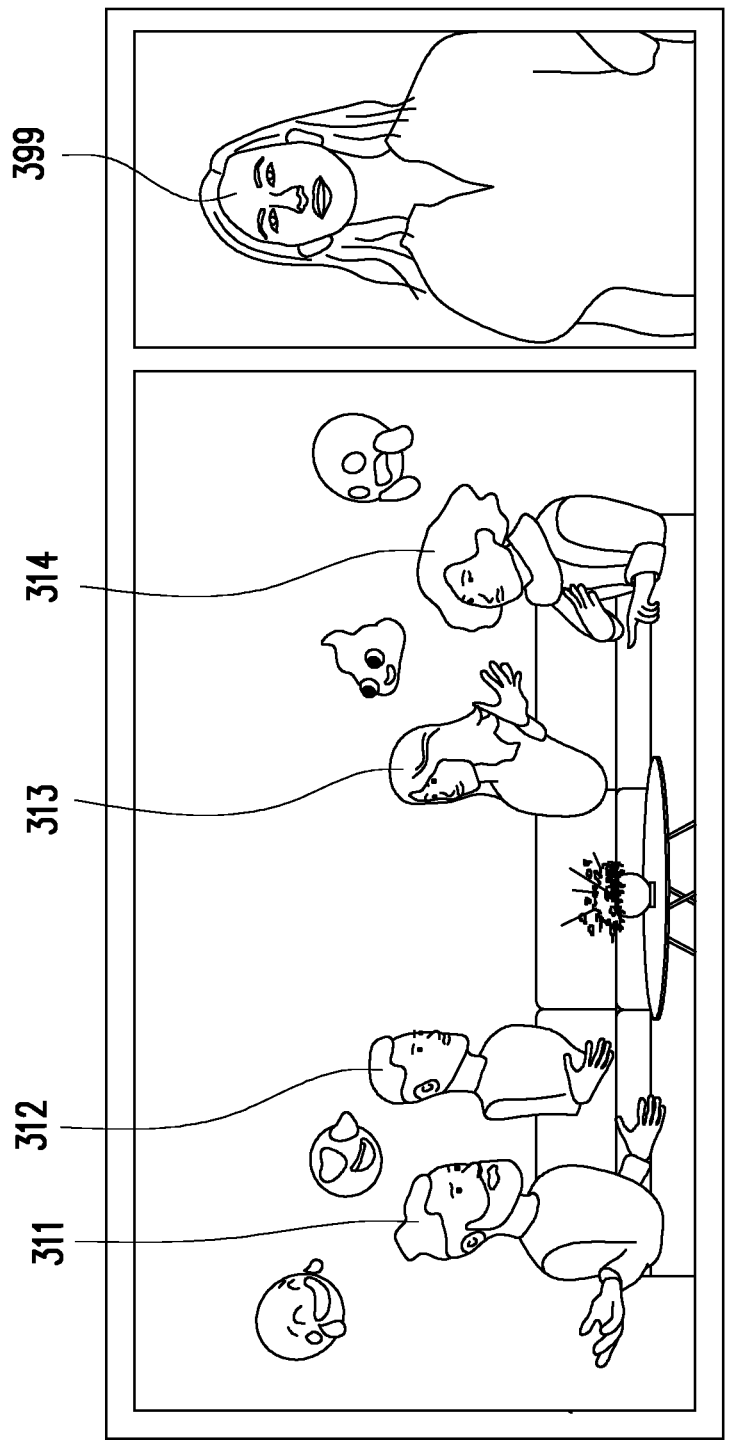
FIG. 3 shows a scene of the virtual meeting according to an embodiment of the disclosure.

See FIG. 3, which shows a scene of the virtual meeting according to an embodiment of the disclosure. In FIG. 3, a scene 300 of the virtual meeting may be shown by the head-mounted display 100 to the wearer, and the scene 300 may include avatars 311-314. Among the avatars 311-314, the avatar 313 may be, for example, the specific avatar representing an external participant 399 without a head-mounted display. More specifically, the external participant 399 may be the one locating in the image capturing range of the front camera 102 of the head-mounted display 100, and the processor 104 may identify the appearance characteristic of the external participant 399 and correspondingly mapping the appearance characteristic of the external participant 399 to the appearance of the avatar 313 (i.e., the specific avatar representing the external participant 399). Accordingly, other participants of the virtual meeting may observe the changes of the appearance characteristics of the external participant 399 from the avatar 313, but the disclosure is not limited thereto.

In some embodiments, the specific avatar in the virtual meeting may be displayed as in a standing posture by default. In this case, if the external participant sits down, the specific avatar may sit correspondingly, and it may be weird for other participants to see the specific avatar sitting on nothing.

Therefore, in response to determining that the external participant changes to a sitting posture, the processor 104 may maintain the specific avatar in the virtual meeting as in the standing posture. That is, the processor 104 may ignore the posture changing of the external participant if the external participant changes from a standing posture to a sitting posture.

In other cases, in response to determining that the external participant changes to a sitting posture, the processor 104 may correspondingly create a seat (e.g., a chair, a rock) for the specific avatar in the virtual meeting to sit. In this way, the weirdness in the above may be prevented.

Further, the specific avatar in the virtual meeting may be displayed as in a sitting posture by default. In this case, the processor 104 may ignore any posture change of a lower body of the external participant. Therefore, during the process of mapping the appearance characteristic of the external participant to the appearance of the specific avatar, only the gesture and/or facial expressions of the external participant would be shown by the specific avatar, but the disclosure is not limited thereto.

Noted that although the embodiments in the above use one external participants for explaining the concept of the disclosure, but the disclosure is not limited thereto. In some embodiments, if there exist multiple external participants in the image capturing range of the head-mounted display 100, the head-mounted display 100 may correspondingly add several specific avatars representing the external participants into the virtual meeting, and use the technical means mentioned in the above to help the external participants to communicate with other participants.

The present disclosure further provides a computer readable storage medium for executing foregoing method for managing avatars in a virtual meeting. The computer readable storage medium is composed of a plurality of program instructions (for example, a setting program instruction and a deployment program instruction) embodied therein. These program instructions can be loaded into the head-mounted display 100) and executed by the same to execute the method for managing avatars in a virtual meeting and the functions described above.

In summary, the method, the head-mounted display, and the non-transitory computer readable storage medium provided in the disclosure may add the specific avatar representing the external participant into the virtual meeting if the external participant is determined to be in the image capturing range of the front camera of the head-mounted display. The head-mounted display may further identify the appearance characteristics of the external participant and accordingly map the identified appearance characteristics of the external participant to the appearance of the specific avatar in the virtual meeting. Accordingly, other participants of the virtual meeting may observe the changes of the appearance characteristics of the external participant from the specific avatar, even though the external participant does not participate the virtual meeting by using any head-mounted display and/or the external participant is not near some of the participants of the virtual meeting.

Further, the disclosure provides several mechanisms for allowing the external participant without a head-mounted display to communicate with other participants in the virtual meeting.

Besides, for avoiding some visual weirdness, the disclosure further provides some mechanism to deal with the posture change of the external participant.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing avatars in a virtual meeting, adapted for a head-mounted display, comprising:
 detecting whether an external participant exists in an image capturing range of a front camera of the head-mounted display while the head-mounted display is participating the virtual meeting, comprising:
  retrieving a voice characteristic of a wearer of the head-mounted display;
  in response to determining that a human voice being detected does not match the voice characteristic of the wearer of the head-mounted display, controlling the front camera to capture a face in the image capturing range;
  in response to determining that the face has been detected in the image capturing range, determining that the external participant existing in the image capturing range of the front camera of the head-mounted display;
 in response to determining that the external participant existing in the image capturing range of the front camera of the head-mounted display, adding a specific avatar representing the external participant into the virtual meeting;
 identifying an appearance characteristic of the external participant;
 mapping the appearance characteristic of the external participant to an appearance of the specific avatar.

2. The method according to claim 1, further comprising:
 providing a notification for the wearer of the head-mounted display to determine whether to add the specific avatar of the external participant into the virtual meeting;
 adding the specific avatar representing the external participant into the virtual meeting in response to determining that the wearer of the head-mounted display has confirmed to add the specific avatar of the external participant into the virtual meeting.

3. The method according to claim 1, wherein the step of adding the specific avatar representing the external participant into the virtual meeting comprising:
 in response to determining that the external participant has a previously used avatar, adding the previously used avatar into the virtual meeting, otherwise creating a new avatar for representing the external participant and adding the new avatar into the virtual meeting.

4. The method according to claim 1, wherein the appearance characteristic of the external participant comprises at least one of a posture, a gesture, and a facial expression of the external participant.

5. The method according to claim 4, wherein the step of mapping the appearance characteristic of the external participant to the appearance of the specific avatar comprising:
 modifying at least one of a posture, a gesture, and a facial expression of the specific avatar based on the appearance characteristic of the external participant.

6. The method according to claim 1, further comprising:
 detecting a specific voice content provided by the external participant;
 controlling the specific avatar to output the specific voice content.

7. The method according to claim 6, further comprising:
 in response to a voice content has been detected, identifying whether a mouth of the external participant is moving;
 in response to determining that the mouth of the external participant is moving when the voice content is being detected, determining that the voice content is the specific voice content provided by the external participant.

8. The method according to claim 7, wherein the external participant locates at a specific location relative to the head-mounted display, and the method further comprising:
 in response to a voice content has been detected, identifying a specific direction where the voice content comes from;
 in response to determining that the specific direction corresponds to the specific location, determining that the voice content is the specific voice content provided by the external participant.

9. The method according to claim 1, wherein the head-mounted display is disposed with a speaker for outputting voice outward, and the method further comprising controlling the speaker to output an audio content associated with the virtual meeting.

10. The method according to claim 1, wherein the head-mounted display is paired with an electronic device, and the method further comprising:
 providing an audio content associated with the virtual meeting to the electronic device for the electronic device to output the audio content.

11. The method according to claim 10, wherein the electronic device comprises at least one of wireless headphones, an external speaker, a smart device, a wired headphone.

12. The method according to claim 1, wherein the specific avatar in the virtual meeting is displayed as in a standing posture by default, and the method further comprising:
  in response to determining that the external participant changes to a sitting posture, maintaining the specific avatar in the virtual meeting as in the standing posture.

13. The method according to claim 1, wherein the specific avatar in the virtual meeting is displayed as in a standing posture by default, and the method further comprising:
  in response to determining that the external participant changes to a sitting posture, creating a seat for the specific avatar in the virtual meeting to sit.

14. The method according to claim 1, wherein the specific avatar in the virtual meeting is displayed as in a sitting posture by default, and the method further comprising:
  ignoring any posture change of a lower body of the external participant.

15. A head-mounted display, comprising:
  a front camera;
  a processor, coupled to the front camera, and configured to:
    detect whether an external participant exists in an image capturing range of the front camera of the head-mounted display while the head-mounted display is participating a virtual meeting;
    in response to determining that the external participant existing in the image capturing range of the front camera of the head-mounted display, add a specific avatar representing the external participant into the virtual meeting;
    identify an appearance characteristic of the external participant;
    map the appearance characteristic of the external participant to an appearance of the specific avatar;
    provide a notification for the wearer of the head-mounted display to determine whether to add the specific avatar of the external participant into the virtual meeting;
    add the specific avatar representing the external participant into the virtual meeting in response to determining that the wearer of the head-mounted display has confirmed to add the specific avatar of the external participant into the virtual meeting.

16. A non-transitory computer readable storage medium, recording an executable computer program to be loaded by a head-mounted display to execute steps of:
  detecting whether an external participant exists in an image capturing range of a front camera of the head-mounted display while the head-mounted display is participating the virtual meeting;
  in response to determining that the external participant existing in the image capturing range of the front camera of the head-mounted display, adding a specific avatar representing the external participant into the virtual meeting;
  identifying an appearance characteristic of the external participant;
  mapping the appearance characteristic of the external participant to an appearance of the specific avatar;
  in response to determining that the external participant has a previously used avatar, adding the previously used avatar into the virtual meeting, otherwise creating a new avatar for representing the external participant and adding the new avatar into the virtual meeting.

* * * * *